US005338337A

United States Patent [19]

Johnson et al.

[11] Patent Number: 5,338,337

[45] Date of Patent: Aug. 16, 1994

[54] BENEFICIATION PROCESS

[75] Inventors: Norman W. Johnson; John P. Andreatidis, both of Mount Isa, Australia

[73] Assignee: Mount Isa Mines Limited, Australia

[21] Appl. No.: 965,064

[22] Filed: Oct. 22, 1992

[30] Foreign Application Priority Data

Oct. 25, 1991 [AU] Australia .......... PK 9152

[51] Int. Cl.[5] .......... B02C 23/14

[52] U.S. Cl. .......... 75/654; 209/164

[58] Field of Search .......... 75/654; 209/164

[56] References Cited

U.S. PATENT DOCUMENTS

| | | | |
|---|---|---|---|
| 4,732,606 | 3/1988 | Köbele | 75/743 |
| 4,860,957 | 8/1989 | Lidstrom | 209/164 |
| 5,019,244 | 5/1991 | Cole | 209/164 |

*Primary Examiner*—Peter D. Rosenberg

*Attorney, Agent, or Firm*—Stevens, Davis, Miller & Mosher

[57] ABSTRACT

The invention relates to a method of ore beneficiation. The process comprises:

(1) grinding the ore to produce a first product comprising ground ore and ground gangue, (2) separating the first product into a fraction having particles of a selected size range and a remainder, (3) separating at least a part of the remainder into a ground ore fraction and a ground gangue fraction, (4) combining the particles of selected size range from step (2) with the ground ore fraction of step (3), and (5) autogenously and/or semi-autogenously grinding the combination of step (4).

The process is particularly suitable for lead and/or zinc sulphide ores.

In step (5) at least 80% of the resulting ore can be ground to a particle size of less than 6 microns.

20 Claims, 1 Drawing Sheet

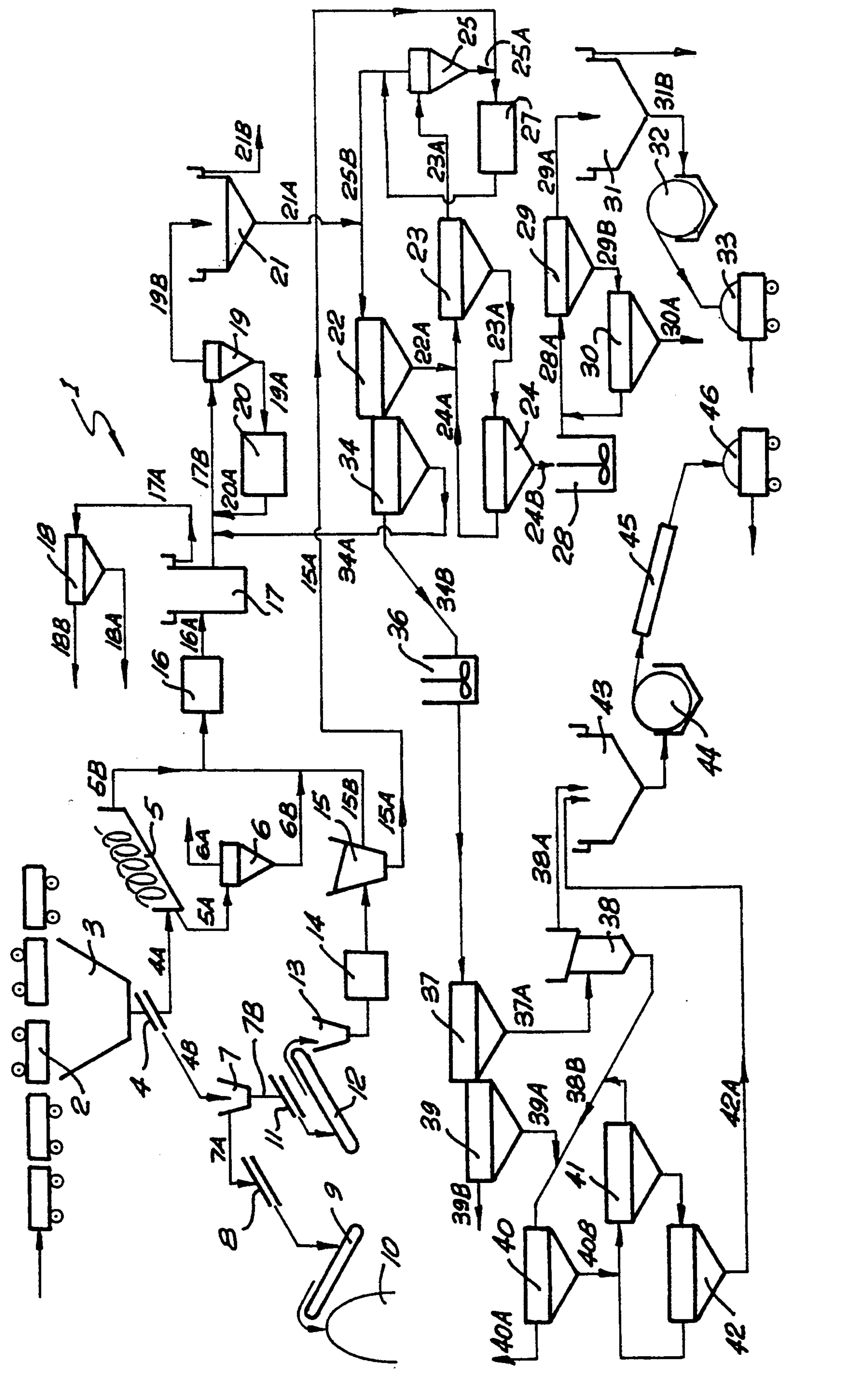

BENEFICIATION PROCESS

BACKGROUND OF THE INVENTION

This invention relates to a method of ore beneficiation.

The method is of particular value for concentrating sulphide ores which are finely distributed in shale or silica and is herein described in that context but is not limited to that use.

In outline, in traditional processes for concentrating sulphide ores, the ores are first crushed through primary jaw crushers and secondary cone crushers to yield a product 80% finer than about 3 mm. The crushed ore is then separated from low-grade material. Low-grade material is separated by a heavy medium process and the heavier high-grade ore is then ground to 90% passing 70–75 microns by means of rod or ball mills. The ball mill discharge is then subjected to further separation from gangue in flotation cells. In the case where lead and zinc sulphide ores are used, the lead ore is floated first and the slurry then conditioned, e.g. with copper sulphate, prior to the zinc being floated. The lead and zinc concentrates so obtained are subsequently de-watered and transported to smelters. This process and variations of it are well known in the art.

Up to a decade ago, flotation feeds were ground down to 75–100 microns. Over the past decade, a plant has been developed which enables flotation feeds to be ground to about 40 microns. That is achieved in tower mills having a nominal capacity in the range of from 10 to 100 tons per hour. A typical tower mill uses a screw agitator driven at 60 to 160 rpm and employs large balls (greater than 6 mm diameter) as a grinding medium. Although it has been claimed that tower mills may be effective with lead and zinc concentrates to reduce particles so that 80% are less than 10 microns, in practice tower mills cannot economically grind better than 80% less than 20 microns because of excessive energy, medium and wear costs.

There are many deposits (for example, those at the McArthur River in Australia) in which sulphide ores (for example, galena, pyrites) are finely distributed in a host gangue (for example, shale and/or silica) and which cannot be economically concentrated by known methods.

SUMMARY OF THE INVENTION

It is an object of the present invention to provide an improved method for beneficiation of ores, and more particularly, of ores finely distributed in a host. It is an object of a preferred embodiment of the invention to provide a more efficient process for recovering sulphide ores which are finely distributed in a host shale and/or silica gangue.

According to one aspect the invention consists of a process for concentrating an ore prior to smelting characterized by the step of introducing the ore to an attrition mill and controlling the mill so as to produce a product of which 80% is less than 15 microns. Preferably the mill is controlled so that at least 80% is less than 6 microns in size. The term "attrition mill" is herein used to include mills used for ultra fine grinding for example, stirred mills in any configuration such as bead mills, colloid mills, fluid energy mills, ultrasonic mills, petit pulverizers, and the like grinders. In a preferred embodiment the attrition mill is a bead mill and the ore is ground autogenously or semi-autogenously therein.

According to a second aspect the invention consists of a process for concentrating an ore contained in a gangue comprising the steps of:

(1) grinding the ore to produce a first product comprising ground ore and ground gangue, (2) separating the first product into a fraction having particles of a selected size range and a remainder, (3) separating at least a part of the remainder into a ground ore fraction and a ground gangue fraction, (4) combining the particles of selected size range from step (2) with the ground ore fraction of step (3), and (5) autogenously and/or semi-autogenously grinding the combination of step (4).

The first product may be crushed ore from which a sand of predetermined size is separated before, during or after a primary ore size classification step. Alternatively the first product may itself be the product of one or more primary size reduction steps for example emanating from primary jaw crushers, ball mills or the like.

Optionally, additional size reduction and/or separation steps may take place between step 2 and step 4.

In a preferred embodiment according to the second aspect, the ore is a lead and/or zinc sulphide ore. The fraction of particles selected in step 2 is of less than 3 mm in diameter and preferably 1–2 mm in diameter. In step (3) the ground ore is separated from the ground gangue by flotation. Step (5) is conducted in a bead mill and the resulting ore has a particle size of 80% less than 6 microns average diameter.

As will be appreciated by those skilled in the art it has been hitherto believed that if ore were ground to below about 20 microns (sometimes referred to in the art as "overgrind"), the flotation processes used in separation are ineffective or at least inefficient. By one theory it is thought that the fine valuable particles do not attach to the bubbles as efficiently as for coarser particles and are consequently not recovered. It is therefore surprising that efficient concentration can be achieved notwithstanding that the concentrate is ground to 80% less than 15 microns and more preferably 80% less than 6 microns in size. Desirably the particles are not ground below 5 microns in size.

Those skilled in the art will also recognize that the use of an attrition mill in the process of concentrating an ore prior to smelting is surprising. In contrast to a tower mill typically having a throughput of from 10 to 100 tons per hour, the largest attrition mills available to date have a maximum throughput of about 5 tons per hour. Moreover attrition mills are normally used to produce very finely ground end product materials such as for example pigments, paper clays and the like which have a particle size of less than 5 microns, and more usually less than 1 micron. It is thus surprising such a mill would be selected to grind an ore in a beneficiation process to a particle size of below 15 microns in quantity at rates of around 50 tons per hour.

Preferred embodiments of the present invention use a bead mill as the attrition grinder. Bead mills employ beads which are less than 6 mm in diameter and more commonly beads of 1 to 2 mm diameter as a grinding medium. The bead medium is typically hardened steel, high chromium steel, aluminium oxide, zirconium silicate, zirconium oxide, glass or the like. The bead medium is typically around 20 times more costly than tower mill balls. Consequently the use of bead mills has hitherto been restricted to grinding products of such high economic value that the cost of grinding could be passed on in the price of the end product. The use of a bead mill in a high throughput, relatively low value product process such as that under discussion has not hitherto been contemplated. That use has been made viable in the present embodiment by employing the bead mill as an autogenous or semi-autogenous grinder, i.e. by autogenously operating the mill without the addition of beads and instead utilizing the material itself as a grinding medium or semi-autogenously operating the mill with the addition of separately obtained solids and/or with beads.

BRIEF DESCRIPTION OF THE DRAWINGS

The single FIGURE of drawings is a schematic showing a typical method of performing the invention with a zinc and lead sulphide ore.

DETAILED DESCRIPTION OF A PREFERRED EMBODIMENT

The invention will now be more particularly described by way of example only with reference to various embodiments.

In the present example a McArthur River sulphide ore comprising lead and zinc sulphides in a host of silicates is mined. The mined material is of around 300 mm average particle size. The mined material is subjected to primary grinding in a semi-autogenous grinder ("SAG" mill) or using a jaw crusher and/or cone crusher or the like whereby the size is reduced to pass a 2.5 mm screen. The size-reduced material is passed successively though screens adapted to pass 2 mm and then 1 mm material whereby a fraction (the "selected cut") having an average particle size in the range of from 1 to 2 mm is separated and removed. The remainder, or at least that part of the remainder passing the 1 mm screen, then passes to one or more flotation tanks. In the flotation tanks, gangue is separated from ore fines. The fines from the flotation tanks are then combined with a portion of the "selected cut" material. For example, one tons of fines slurry is combined with from 1-200 kilogram of "selected cut" material. The ratio of slurry to "selected cut" material can be from 1:1 to greater than 1000:1. Typically, a ratio of 200:1 is used.

The combination is then introduced into an attrition grinder, preferably a bead mill and in the present example a NETZSCH LME 1OOK, although in commercial practice a NETZSCH LME500K has been used. The preferred mill has coaxial screens which reduces any tendency to block. The material is ground in the mill without addition of any beads other than the "selected cut". In the present example the "selected cut" is silica passing a 2 mm screen and retained on a 1 mm screen and has very angular particles. Thus the material from the selected cut is autogenously ground along with the remaining material. The mill is operated so that at least 80% of the material is of less than 15 microns, more preferably less than 10 microns and desirably less than 6 microns in size. When the mill is operated in this way a surprisingly high throughput is obtained at a surprisingly low cost.

The ground material is then treated in flotation cells, for example, JAMESON cells. Surprisingly it has been found that an effective separation can be obtained in the flotation cell notwithstanding the fine particle size of the concentrate.

The concentrate from the flotation cells may be processed in a conventional manner.

Other bead mills which may be suitable are of the type available from FRYMA and DRAIS or modified version of more conventional stirred mills such as supplied by SALA or METPROTECH.

Although the process has been described with reference to zinc and lead ores, it will be understood to be applicable to other ores for example, copper sulphides.

Attrition mills other than bead mills can be employed in less highly preferred embodiments. The "selected cut" particle size range may be varied according to the mill employed and the optium particle size range may be determined by simple experiment having regard to the teaching hereof.

Although in the preferred embodiment the "selected cut" is taken before the primary ground material is subjected to flotation separation it will be understood that in another embodiment a primary cut could be taken from the gangue removed after the flotation tanks or from separately mined/obtained solid which could then be combined with fines from the flotation tank and then subjected to the attrition grinding step.

It will also be understood that the ratio of "selected cut" to slurry in the attrition grinding step may be varied to an extent which can readily be determined via simple tests.

By way of further example of an embodiment of the invention, a typical method of performing the invention with a zinc and lead sulphide ore is shown schematically in FIG. 1.

Run-of-mine ore is crushed underground through Primary Jaw Crushers and Secondary Cone Crushers (not shown) to yield a product 80% finer than 1.5 inches. The ore is then delivered by rail cars 2 to a concentrator 1.

The ore is placed in ore bins 3 and gravity separation is commenced to remove the low grade material prior to the subsequent grinding and flotation circuits. The gravity separation is achieved by passing the ore through a screen 4 and separating the ore into two fractions. One fraction 4A passes through the screen 4, and typically has a diameter of less than 3/16 inch. This fraction is then passed to a spiral classifier 5 to further separate the fraction, the tailings 5A of the spiral classifier being directed to a slime cone 6 where it is further separated, the undersize particles 6A being removed as overflow to the flotation circuit. The other fraction not passing through the screen 4B which typically has a diamater greater than 3/16 inch, is passed to a separator 7, the media of which is controlled to have a specific gravity controlled to about 2.95 such that low grade material having a specific gravity less than 2.95 is floated off 7A to a mesh screen 8 in which it is separated from the media and then conveyed by a conveyor 9 to a float pile 10. Approximately 30% of the rock from the mine is removed as float rock with less than 1% of the contained lead or zinc being lost.

High grade material as a heavy medium which sinks in the separator 7 is passed 7B to a mesh screen 11 in which it is separated from the media, and then conveyed by conveyor 12 to a sink bin 13. High grade ore from sink bin 13 is then comminuted in a rod mill 14 and passed to a screen 15 where material 15A passing 1.00 to 3.00 mm is separated. The remaining fraction 15B is combined with the oversize material 5B, 6B separated by the spiral classifier 5 and slime cone 6. That combination is comminuted by six primary ball mills 16 and passed to tank cell 17 where a coarse lead concentrate 17A is floated off to a coarse lead cleaner 18. The portion 18A floating in the cleaner is returned to the separator 7, and the portion sinking 18B is returned to a mill. The material 17B remaining in the tank cell 17 is passed to a hydrocyclone 19, material 19A sinking in the hydrocyclone being directed to eight secondary ball mills 20 where they are again comminuted and redirected 20A to hydrocyclone 19. The material 19B which floats in the hydrocyclone 19 is fed to a feed thickener 21. The material fed to the thickener typically is of a size passing 74 microns (200 mesh).

The material in feed thickener 21 is thickened typically to give a flotation feed of 50 to 55% solids by weight. Water 21B from the feed thickener is recycled into the process. The lead is then floated off. This is achieved by passing the material 21A from the feed thickener to a rougher 22 where a lead concentrate 22A is separated from the material. The lead concentrate 22A is passed to a first lead cleaner 23 and to a second lead cleaner 24, the tailings 24A of the second lead cleaner being returned to first lead cleaner 23, and the tailings 23A of the first lead cleaner to a hydrocyclone 25, the underflow 25A of which is combined with the material 15A separated by screen 15. The combination is fed to bead mill 27 and then combined with the overflow 25B of the hydrocyclone and passed to rougher 22. The lead concentrate 24B from the second lead cleaner 24 is passed to a conditioner 28 where it is dezinced by conditioning with $CuSO_4$. The material 28A is then passed to a "dezinc" rougher 29 where zinc is floated off. The zinc concentrate 29B is then cleaned in cleaner 30 and passed to a zinc thickener 43. The tailings 29A from dezincer 29 is the final lead product which is dewatered in a lead thickener 31, filtered by filter 32 and passed to railcars 33 for transport to a smelter.

The slurry which remains in lead rougher 22 after floating is passed to a lead scavenger 34, any scavenger concentrate 34A being passed to hydrocyclone 19 for further processing in the secondary grinding circuit.

Lead scavenger tails 34B are passed to a conditioner 36 where they are conditioned with $CuSO_4$ and passed to a zinc rougher 37 to give a zinc concentrate 37A which is fed to a column cell 38 to scalp off a final grade concentrate 38A. The tailings of the zinc rougher 37 are passed to a zinc scavenger 39 to give a scavenger concentrate 39A and tailings 39B. Tailings 39B are directed to a tailing pond (not shown). The scavenger concentrate 39A is combined with the column tails 38B and sent to three stages of conventional cleaning which includes a first zinc cleaner 40, a second zinc cleaner 41 and a third zinc cleaner 42. The tails from the first zinc cleaner 40A are directed to the head of the feed thickener 21 and the concentrate 42A of the third zinc cleaner 42 is combined with the column cell concentrate 38A and the concentrate from dezincer 30A to make up the final zinc product which is dewatered in a thickener 43, filtered by filter 44, dried by rotary drier 45 and passed to railcars 46 for transport to a smelter.

In alternative embodiments not illustrated, screen 15 is located downstream of primary ball mills 16 and/or secondary ball mills 20. Material 16A or 20A is fed to screens where particles of 1–3 mm, more preferably 1–2 mm are removed. The remainder of material 16A or 20A passes to tank cell 17 (when the screen is located downstream of primary ball mills 16), hydrocyclone 19, thickener 21 and rougher 22. Lead concentrate 22A is cleaned in cleaner 23 and tailings 23A are treated in hydrocyclone 25. The underflow 25A from hydrocyclone 25 is then combined with the particles of 1–3 mm from screen 15 for autogenous or semi-autogenous grinding in the bead mill 27.

As will be apparent to those skilled in the art from the teaching hereof the grinding, cleaning and separating steps may be repeated or combined in many ways and the size selected material to be combined with the concentrate fed to the bead mill may be taken from any suitable location in the process sequence.

To an extent which will be apparent from the teaching hereof, the invention may be embodied in other forms and performed in other ways without departing from the scope of the inventive concept.

We claim:

1. A process for concentrating an ore contained in a gangue comprising the steps of:
(1) grinding the ore to produce a first product comprising ground ore and ground gangue,
(2) separating the first product into a fraction having particles of a selected size range and a remainder,
(3) separating at least a part of the remainder into a ground ore fraction and a ground gangue fraction,
(4) combining the particles of selected size range from step (2) with the ground ore fraction of step (3), and
(5) autogenously grinding the combination of step (4).

2. A process according to claim 1 wherein the first product is crushed ore from which a sand of predetermined size is separated during or after a primary ore size classification.

3. A process according to claim 1 wherein the first product is the product of one or more primary size reduction steps.

4. A process according to claim 1, wherein the ore is a lead and/or zinc sulphide ore.

5. A process according to claim 1, wherein the fraction of particles selected in step (2) is of less than 3 mm in diameter.

6. A process according to claim 5, wherein the fraction of particles is 1 to 2 mm in diameter.

7. A process according to claim 1, wherein in step (3) the ground ore is separated from the ground gangue by flotation.

8. A process according to claim 1, wherein step (4) is conducted in a bead mill and the resulting ore has a particle size of 80% less than 6 microns average diameter.

9. A process according to claim 1, further comprising separating the product of step (5) into a ground ore fraction and a ground gangue fraction.

10. A process according to claim 9, wherein the ground ore is separated from the ground gangue by means of flotation.

11. A process for concentrating an ore contained in a gangue comprising the steps of:
(1) grinding the ore to produce a first product comprising ground ore and ground gangue,
(2) separating the first product into a fraction having particles of a selected size range and a remainder,
(3) separating at least a part of the remainder into a ground ore fraction and a ground gangue fraction,
(4) combining the particles of selected size range from step (2) with the ground ore fraction of step (3), and
(5) semi-autogenously grinding the combination of step (4).

12. A process according to claim 11 wherein the first product is crushed ore from which a sand of predetermined size is separated during or after a primary ore size classification.

13. A process according to claim 11 wherein the first product is the product of one or more primary size reduction steps.

14. A process according to claim 11, wherein the ore is a lead and/or zinc sulphide ore.

15. A process according to claim 11, wherein the fraction of particles selected in step (2) is of less than 3 mm in diameter.

16. A process according to claim 11, wherein the fraction of particles is 1 to 2 mm in diameter.

17. A process according to claim 11, wherein step (3) the ground ore is separated from the ground gangue by flotation.

18. A process according to claim 11, wherein step (4) is conducted in a bead mill and the resulting ore has a particle size of 80% less than 6 microns average diameter.

19. A process according to claim 11, further comprising separating the product of step (5) into a ground ore fraction and a ground gangue fraction.

20. A process according to claim 19, wherein the ground ore is separated from the ground gangue by means of flotation.

* * * * *